(12) United States Patent
Bornstein

(10) Patent No.: US 11,910,853 B2
(45) Date of Patent: *Feb. 27, 2024

(54) FACE SHIELD INTEGRATION WITH EYEWEAR

(71) Applicant: Julia Bornstein, Muttontown, NY (US)

(72) Inventor: Julia Bornstein, Muttontown, NY (US)

(*) Notice: Subject to any disclaimer, the term of this patent is extended or adjusted under 35 U.S.C. 154(b) by 241 days.

This patent is subject to a terminal disclaimer.

(21) Appl. No.: 17/558,576

(22) Filed: Dec. 21, 2021

(65) Prior Publication Data

US 2022/0110388 A1 Apr. 14, 2022

Related U.S. Application Data

(63) Continuation-in-part of application No. 17/528,134, filed on Nov. 16, 2021, now Pat. No. 11,497,262, which is a continuation of application No. 16/908,506, filed on Jun. 22, 2020, now Pat. No. 11,206,883, which is a continuation of application No. 16/905,839, filed on Jun. 18, 2020, now Pat. No. 11,206,882.

(51) Int. Cl.
*A41D 13/11* (2006.01)
*G02C 5/22* (2006.01)

(52) U.S. Cl.
CPC .................................. *A41D 13/1184* (2013.01)

(58) Field of Classification Search
CPC .......... A61F 9/029; A61F 9/025; A61F 9/045; A61F 9/02; A61F 9/022; G02C 7/16; G02C 11/12; G02C 2200/08; G02C 9/00; A41D 13/1184; A41D 13/11; A62B 18/082

See application file for complete search history.

(56) References Cited

U.S. PATENT DOCUMENTS

| | | | |
|---|---|---|---|
| 971,372 | A | 9/1910 | Hamilton |
| 1,561,958 | A | 11/1925 | Tully |
| 2,093,536 | A | 2/1936 | Alvord |
| 2,253,101 | A | 4/1939 | Thoreson |
| 2,541,242 | A | 2/1951 | Grove |
| 4,405,212 | A | 9/1983 | Cooper |
| 4,654,899 | A | 4/1987 | Harris |
| 4,701,965 | A | 10/1987 | Landis |
| 5,339,119 | A | 8/1994 | Gardner |
| 5,388,269 | A | 2/1995 | Griffin |
| 5,771,500 | A | 6/1998 | Mayes |
| 6,481,845 | B1 | 11/2002 | Gazzara |
| 10,098,787 | B2 | 10/2018 | Umentum et al. |
| 10,532,879 | B2 | 1/2020 | Ito et al. |
| 10,687,981 | B2 | 6/2020 | Calilung et al. |
| 11,206,882 | B1 * | 12/2021 | Bornstein .......... A41D 13/1184 |
| 11,206,883 | B1 * | 12/2021 | Bornstein .......... A41D 13/1184 |
| 11,318,333 | B1 * | 5/2022 | Ellerbrake .............. A62B 23/02 |
| 11,497,262 | B2 * | 11/2022 | Bornstein .......... A41D 13/1184 |
| 2002/0029399 | A1 | 3/2002 | Hill |
| 2004/0025232 | A1 | 2/2004 | Hartley et al. |
| 2004/0051839 | A1 | 3/2004 | Tagawa |
| 2004/0117898 | A1 | 6/2004 | Penque, Jr. et al. |

(Continued)

*Primary Examiner* — Robert H Muromoto, Jr.
(74) *Attorney, Agent, or Firm* — Greenberg Traurig, LLP

(57) ABSTRACT

Disclosed herein are face shields, eyewear, and kits which provide a user the ability to protect their face from solids or liquids while simultaneously providing the ability to manipulate any eyewear the user may desire to wear.

20 Claims, 13 Drawing Sheets

(56) References Cited

U.S. PATENT DOCUMENTS

| | | | |
|---|---|---|---|
| 2006/0039813 A1* | 2/2006 | Thomas | F04B 39/125 |
| | | | 417/571 |
| 2013/0014316 A1 | 1/2013 | Castro et al. | |
| 2014/0318084 A1 | 10/2014 | Schultz | |
| 2015/0351965 A1 | 12/2015 | Umentum et al. | |
| 2022/0071324 A1* | 3/2022 | Bornstein | A41D 13/1184 |
| 2022/0110388 A1* | 4/2022 | Bornstein | G02C 9/02 |

* cited by examiner

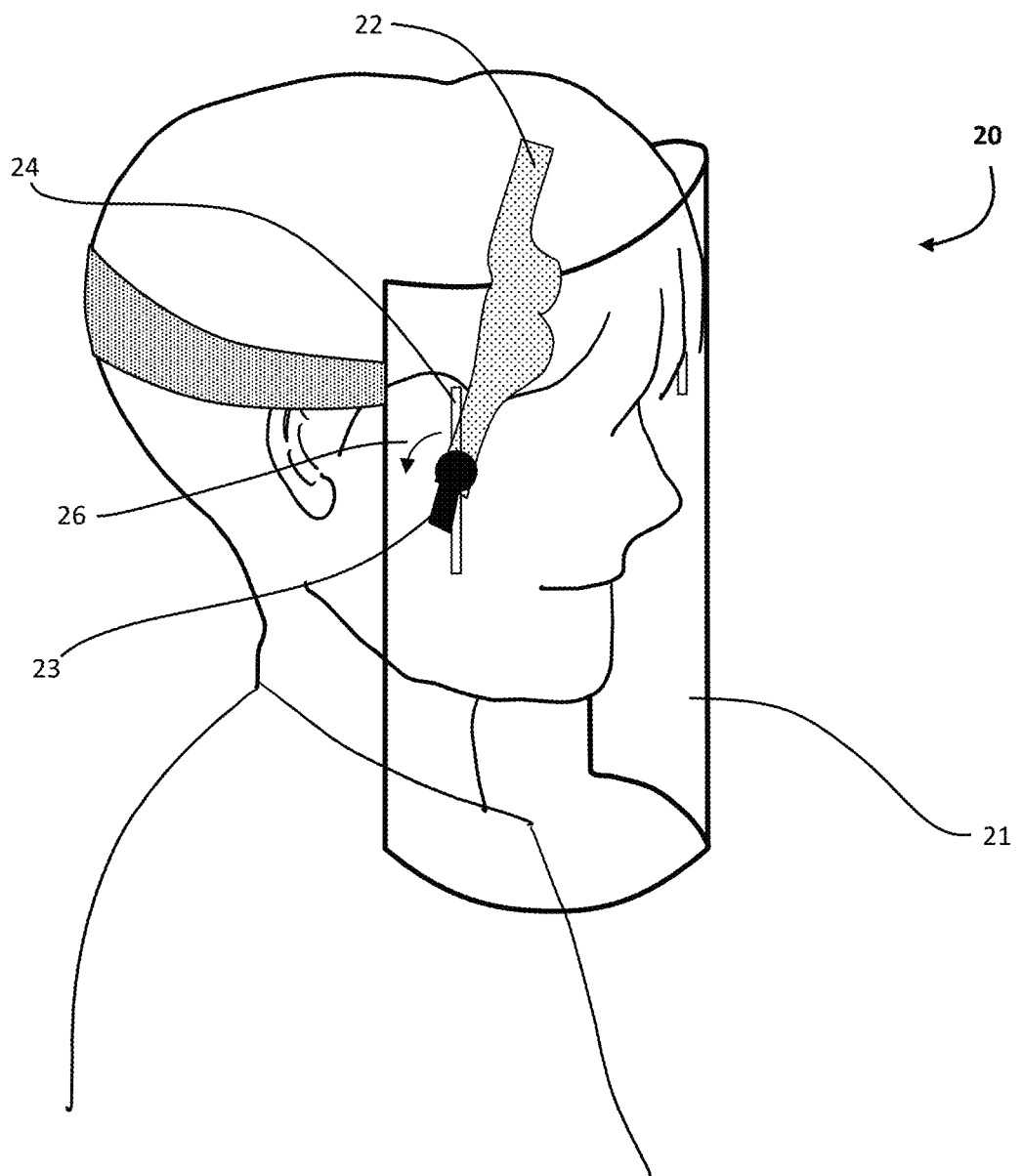

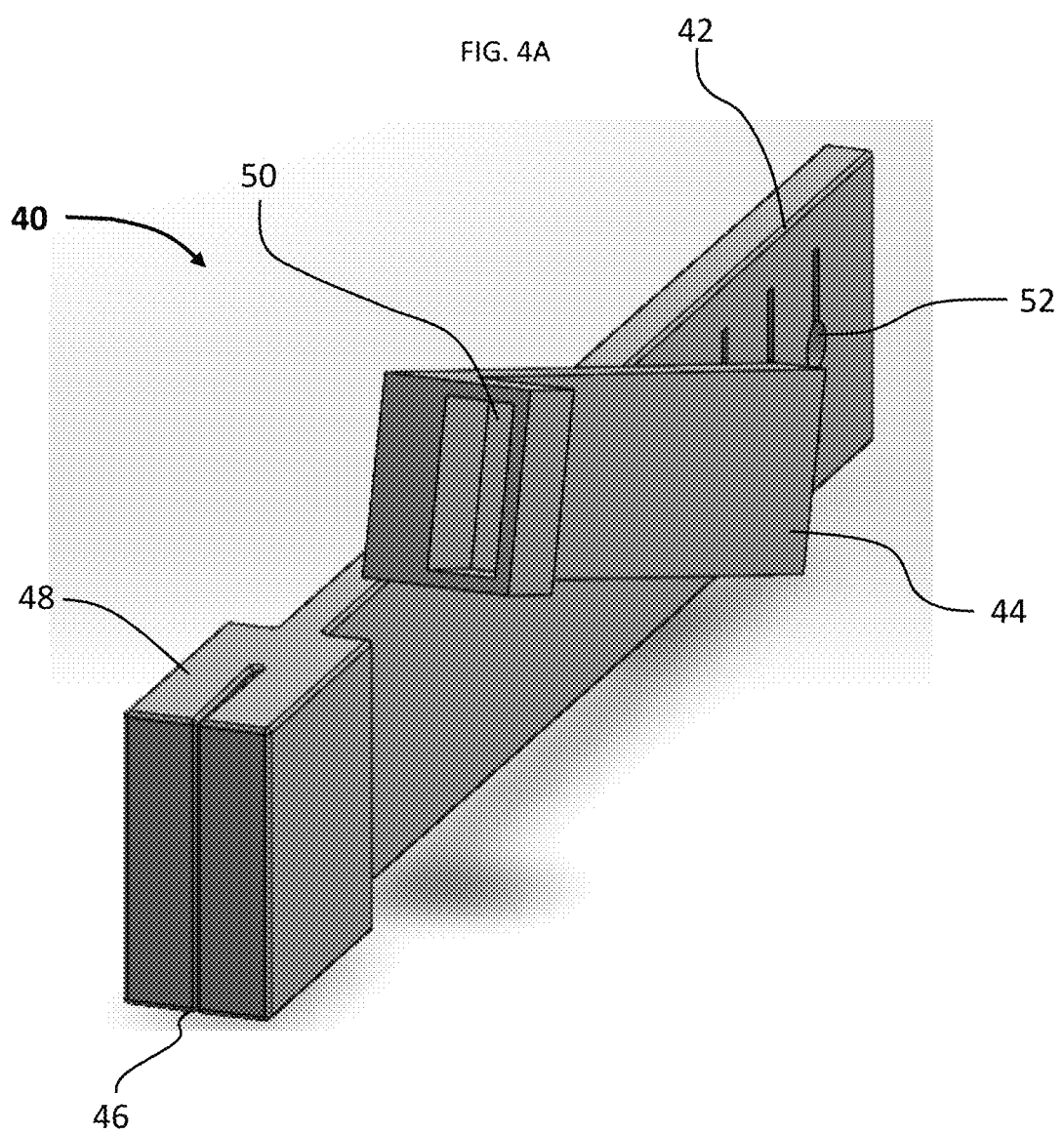

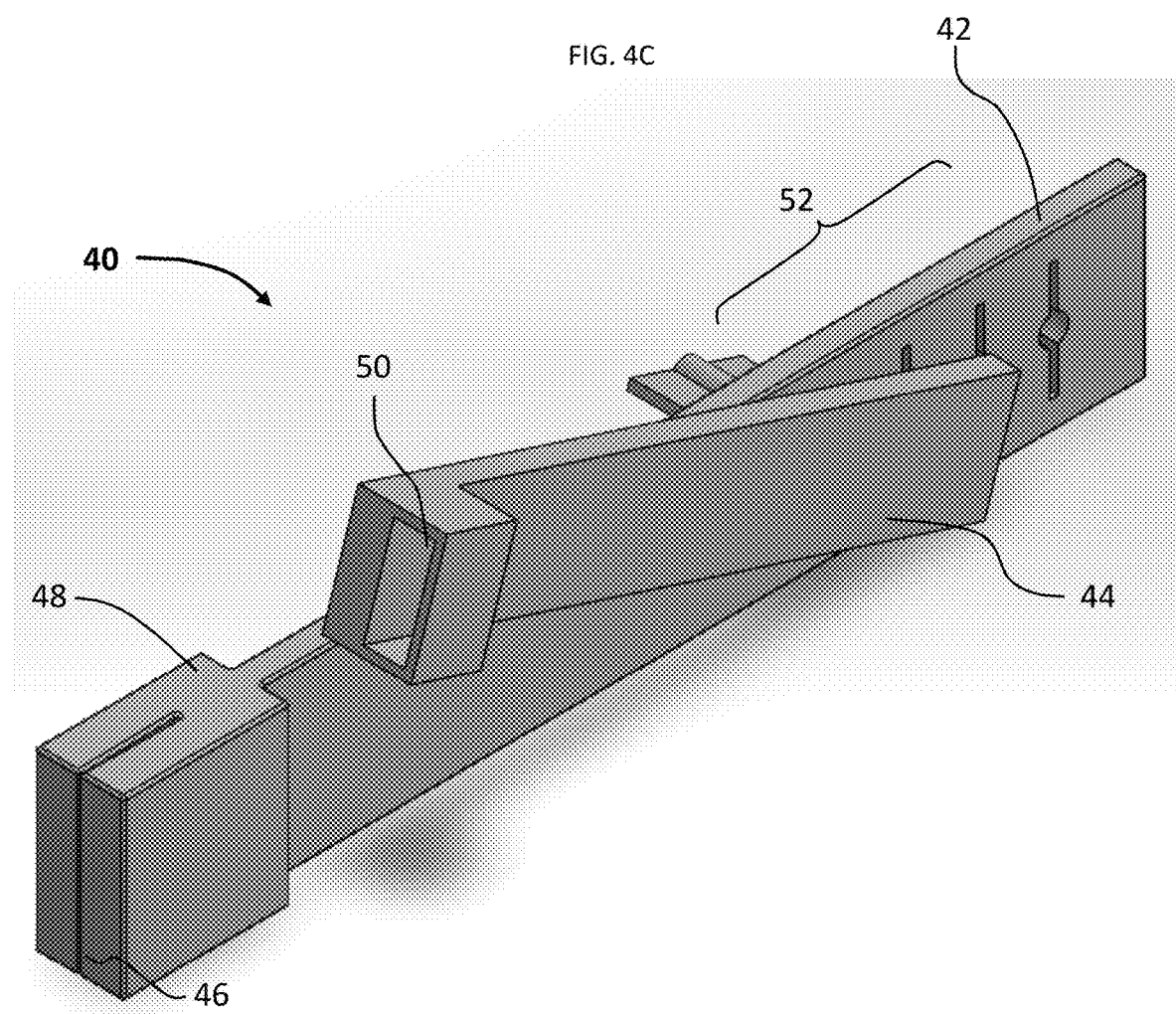

FACE SHIELD INTEGRATION WITH EYEWEAR

CROSS REFERENCE TO RELATED APPLICATIONS

This application is a continuation in part application claiming priority to and the benefit of U.S. application Ser. No. 17/528,134, filed Nov. 16, 2021, which is a continuation application claiming priority to and the benefit of U.S. application Ser. No. 16/908,506, filed Jun. 22, 2020, which is a continuation application claiming priority to and the benefit of U.S. application Ser. No. 16/905,839, filed Jun. 18, 2020, each of which is hereby incorporated by reference in its entirety.

FIELD OF DISCLOSURE

The present disclosure is related to face shields allowing for the manipulation of eyewear without removal of the face shield.

BACKGROUND

Face shields provide a protective barrier for users desiring not to be exposed to various solid and liquid materials. For example, face shields are routinely used in the medical community to prevent the inhalation of airborne pathogens trapped in aerosolized particles of body fluid. Users also often want to wear some sort of eyewear to augment their vision (e.g., focusing light, block certain wavelengths of light, magnification) with use of these face shields. However, when eyewear is worn with face shields, the eyewear often becomes fogged as condensation accumulates on the lenses of the eyewear thereby inhibiting its utility. Moreover, prescription glasses could shift out of the desired location resulting in blurry vision, or the user may desire to take some eyewear such as reading glasses on or off while working. Often, in order to remove the condensation or to adjust glasses, a user is forced to remove the face shield as well. Removal of the face shield may compromise the integrity afforded by the device and/or require the user to wait until they are in an uncompromised situation before cleaning of the lenses can occur. Moreover, fogging of the eyewear is often uncomfortable for the user and inhibits the utility of these protective devices.

It is therefore an object of the present disclosure to provide face shields which limit these compromised and/or uncomfortable situations to allow for more continued use without removal.

SUMMARY

In accordance with the foregoing objectives and others, the present disclosure provides face shields whereby a user may move eyewear typically worn under a face shield without removal of the face shield itself. Accordingly, adjustments of eyewear are possible with the face shields of the present disclosure without compromising the prevention of inhalation of unwanted material (e.g., aerosolized pathogens) typically afforded by the face shield during use. It will be understood that the face shields of the present disclosure may include any device that prevents migration of foreign material to a user's face and covers the eyes including face masks and gas masks, unless otherwise indicated. In some embodiments, the face shield is a gas mask. In some embodiments, the face shield comprises a solid barrier that prevents the passage of solids and liquid therethrough, and a support strap which extends around the head of the user to position the solid barrier in front of the face of the user (e.g., to cover the eyes of a user and optionally the nose or the nose and the mouth of a user).

The face shields of the present disclosure may comprise a solid barrier that prevents the passage of solids and liquids therethrough; wherein
   said solid barrier comprises one or more eyewear attachment elements configured to allow for an eyewear element to be removably attached to said solid barrier; and
   said eyewear element comprises lenses which refract light into the eyes of a user wearing the face shield when the eyewear element is attached to the solid barrier.

In some embodiments, the face shield may comprise:
   a) a solid barrier that prevents the passage of solids and liquids therethrough;
   b) an eyewear attachment element configured to attach or removably attach to eyewear;
   c) an eyewear movement element configured to allow movement of the eyewear with respect to the solid barrier when said eyewear is attached;
wherein the eyewear movement element is configured such that attached eyewear may be moved into a first position where the lenses of the eyewear are positioned between the solid barrier and the eyes of a user wearing the face shield; the attached eyewear may be moved into a second position where the lenses of the eyewear are not positioned between the solid barrier and the eyes of a user wearing the face shield; and
movement of the eyewear from the first position to the second position can be effectuated without removal of the face shield from the face of a user.

In various implementations, the face shield may comprise:
   a) a solid barrier that prevents the passage of solids and liquids therethrough;
   b) eyewear comprising a bridge between lenses; wherein the bridge is configured to separate the eyewear into a first portion and a second portion; wherein the first portion and the second portion each comprises a lens and a temple frame of the eyewear; and
   said bridge comprises a bridge attachment element to attach the first portion and the second portion together;
   c) an eyewear movement element (e.g., swivel, hinge) configured to move the first portion or the second portion to a position where the lens of the portion attached to the eyewear movement element is not positioned between the solid barrier and the eyes of a user wearing the face shield;
wherein when the first portion and the second portion are attached at the bridge, the lenses of the eyewear are positioned between the solid barrier and the eyes of a user wearing the face shield; and
movement of the eyewear portion can be effectuated without removal of the face shield from the face of a user.

The disclosure also relates to eyewear element dimensioned for use with the face shields as described herein. Typically, the eyewear element comprises a frame which may attach (e.g., removably attach) to one or more lenses, and be dimensioned to be attached to the face shields of the present disclosure and/or comprise one or more attachment elements such that the eyewear element can be configured to attach to a face shield during use. In some embodiments, the eyewear element comprises a frame dimensioned to be supported by the nose of a user. In some embodiments, the eyewear comprises a separable bridge section, wherein the eyewear may be separated into two portions each comprising a lens. The eyewear may comprise a movement element (e.g., hinge) located in the frame (e.g., temple) such that the two portions may be separated. Each portion may comprise, for example, a lens and a temple. In some embodiments, each portion may comprise, for example, a lens, a temple, and a temple tip. When integrated with the face shields of the present disclosure, the two portions may be separated and independently moved to positions where the lenses may be cleaned.

Kits are also provided comprising face shields of the present disclosure and eyewear elements for use therewith. In some embodiments, the kit may comprise:
a) a solid barrier that prevents the passage of solids and liquids therethrough; wherein the solid barrier comprises one or more eyewear attachment elements configured to allow for an eyewear element to be removably attached to said solid barrier; and
b) an eyewear element capable of being removably attached to the solid barrier comprising lenses which refract light into the eyes of a user wearing the face shield when the eyewear element is attached to the solid barrier.

An apparatus which may be used to attach to face shields and afford the eyewear movement functionality of the present disclosure is also disclosed. The apparatus may comprise:
a) an eyewear attachment element configured to removably attach to eyewear;
b) an eyewear movement element configured to allow movement of the eyewear with respect to the solid barrier when said eyewear is attached;
c) a solid barrier attachment element configured to removably attach to the solid barrier of a face shield;
wherein said eyewear movement element is configured such that attached eyewear may be moved into a first position (e.g., via a swivel) where the lenses of the eyewear are positioned between the solid barrier and the eyes of a user wearing the face shield with the apparatus attached thereto; the attached eyewear may be moved into a second position (e.g., via the swivel) where the lenses of the eyewear are not positioned between the solid barrier and the eyes of a user wearing the face shield with the apparatus attached to the solid barrier; and
movement of the eyewear from the first position to the second position can be effectuated without removal of the face shield from the face of a user. For example, the apparatus may have a base portion comprising said solid barrier attachment element and a rotation portion comprising said eyewear attachment element at an end thereof;
wherein said rotation portion is attached to said base portion by a swivel. In some embodiments, the swivel is formed from a post which extends through said base portion comprises a point of attachment for said post; or said swivel is formed from a post which extends through said rotation portion and said base portion comprises a point of attachment for said post. In various implementations, the post may be a screw comprising a threaded portion and said point of attachment is a threaded hole dimensioned for said screw.

The base portion may provide the required support for rotation of the eyewear in its sole point of attachment to the solid barrier. The base portion may include additional functional features to effect rotation of the eyewear including several attachment points to the rotation. The base portion may comprise a plurality of holes independently threaded and unthreaded, and wherein said each of said holes in said plurality of holes (e.g., two, three, four, five, six) is dimensioned for insertion of a post to form the swivel. In some embodiments, the base portion comprises a major longitudinal axis and said solid barrier attachment element (e.g., a clip) is at a distal end of said base portion along the major longitudinal axis. The base portion may comprises a plurality of holes dimensioned for insertion of a post to form the swivel; wherein said plurality of holes are positioned along the major longitudinal axis. The plurality of holes may afford different axes of rotation selectable by a user in order to fit the user's head, eyewear, and face shield. For example, the base portion may dimensioned such that temple tips of the eyewear in said first position are supported by a user's ears wearing said face shield. It may have a length along the major longitudinal axis of, for example, from 1 cm to 10 cm or from 3 cm to 8 cm or from 1 cm to 8 cm or from 2 cm to 6 cm. In some embodiments, the distance between the solid barrier attachment element and at least one hole is from 1 cm to 10 cm or from 3 cm to 8 cm or from 1 cm to 8 cm or from 2 cm to 6 cm. The base portion may comprise a plurality of holes dimensioned for insertion of a post to form the swivel; wherein said plurality of holes are positioned along the major longitudinal axis at the end of the base portion opposite the distal end comprising the solid barrier attachment element.

Objects having a major longitudinal axis typically have a cross sectional dimension along one axis (the major longitudinal axis) than in the orthogonal axis (the minor longitudinal axis). These objects may adopt many configurations. For example, in some embodiments, the base portion is rectangular and/or the cross section of the rotation portion is rectangular, parallelpiped, circular, ovoid, rhomboid, trapezoidal, or combinations thereof. In various implementations, the major longitudinal axis is an axis of symmetry. In some embodiments, the rotation portion comprises a major longitudinal axis and said eyewear attachment element (e.g., a port) is at a distal end of said rotation portion along the major longitudinal axis.

BRIEF DESCRIPTION OF FIGURES

FIG. 2C is an illustration of a user wearing a face shield of the present disclosure wherein the eyeglass element has been moved to be positioned away from the eyes of the user.

FIGS. 4A-4F are illustrations of different views of an apparatus for attachment to the solid barrier of a face shield to allow movement of the eyewear as disclosed herein. In FIG. 4D, the black dashed line shows the major longitudinal axis of the base portion and the white dashed line shows the major longitudinal axis of the rotation portion.

DETAILED DESCRIPTION

Detailed embodiments of the present disclosure are disclosed herein; however, it is to be understood that the disclosed embodiments are merely illustrative of the disclosure that may be embodied in various forms. In addition, each of the examples given in connection with the various embodiments of the disclosure is intended to be illustrative, and not restrictive.

All terms used herein are intended to have their ordinary meaning in the art unless otherwise provided. All concentrations are in terms of percentage by weight of the specified component relative to the entire weight of the topical composition, unless otherwise defined.

As used herein, "a" or "an" shall mean one or more. As used herein when used in conjunction with the word "comprising," the words "a" or "an" mean one or more than one. As used herein "another" means at least a second or more.

As used herein, all ranges of numeric values include the endpoints and all possible values disclosed between the disclosed values. The exact values of all half integral numeric values are also contemplated as specifically disclosed and as limits for all subsets of the disclosed range. For example, a range of from 0.1% to 3% specifically discloses a percentage of 0.1%, 1%, 1.5%, 2.0%, 2.5%, and 3%. Additionally, a range of 0.1 to 3% includes subsets of the original range including from 0.5% to 2.5%, from 1% to 3%, from 0.1% to 2.5%, etc. It will be understood that the sum of all % of individual components will not exceed 100%.

The face shields of the present disclosure afford the ability for a user to manipulate eyewear while wearing a face shield, and to do so without removing the face shield. This may allow for a user to keep the face shield on for longer amounts of time without issues relating to the eyewear.

Figure 1A:
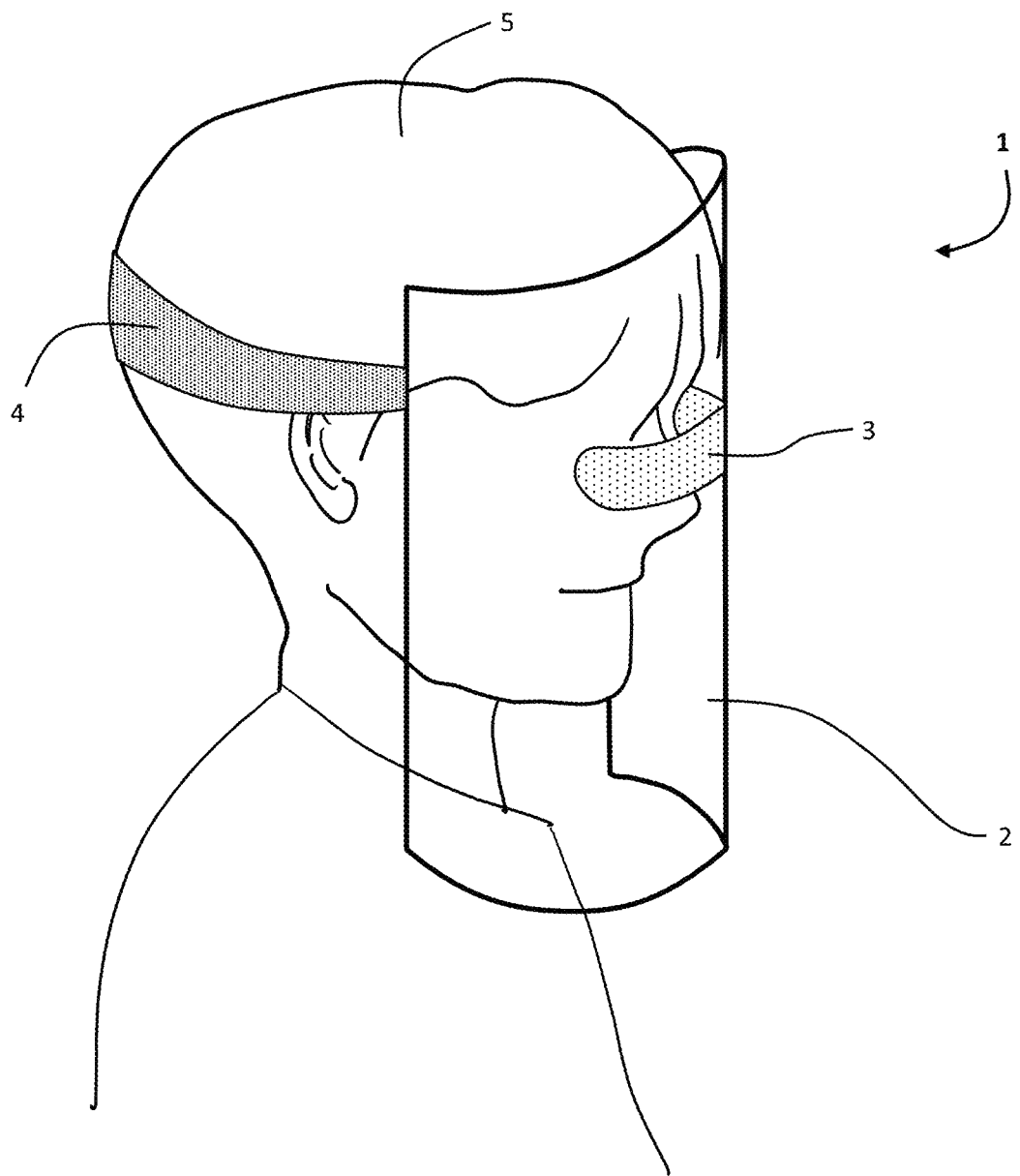
FIG. 1A is an illustration of a user wearing a face shield of the present disclosure.
Figure 1B:
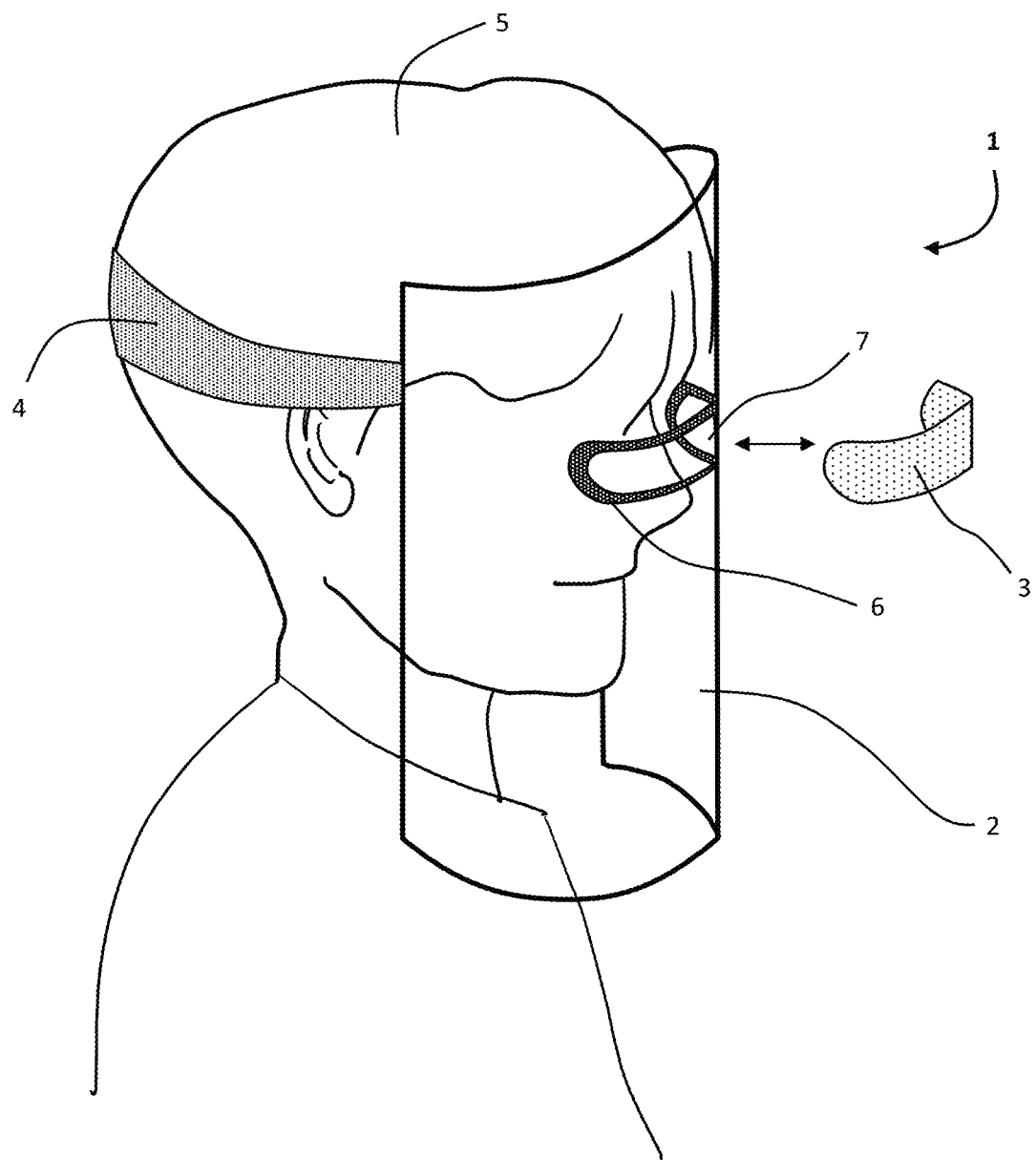
FIG. 1B is an expanded illustration of the face shield of FIG. 1A.

In some embodiments, the face shield may comprise a shield comprising a solid barrier that prevents the passage of solids and liquids therethrough; wherein the solid barrier comprises one or more eyewear attachment elements configured to allow for an eyewear element to be removably attached to said solid barrier; and the eyewear element comprises lenses which refract light into the eyes of a user wearing the face shield when the eyewear element is attached to the solid barrier. Referring now to FIGS. 1A and 1B, face shield 1 comprises solid barrier 2 which is dimensioned such that the eyes, nose, and mouth of user 5 are shielded from solids and liquids passing through solid barrier 2. Face shield 1 comprises strap 4 which extends around the head of user 5 providing support for solid barrier 2 over the face of user 5. Face shield 5 comprises an eyewear element 3 positioned proximal to the eyes of the user such that light may pass through (e.g., refract) through eyewear element 3 and into the eyes of user 5. Refraction through eyewear element 3 may occur in a prescriptive sense, for example, such that eyewear element 3 may comprises one or more lenses which reflect light in a manner to correct the vision of user 5. In some embodiments, the lens may produce a magnified image to the user (e.g., such as lenses used in reading glasses). As can be seen in FIG. 1B, eyewear element 3 is removably attached to the external surface of solid barrier 2. Solid barrier 2 comprises one or more eyewear attachment elements 7 (e.g., adhesive, snaps, loop and hook configurations such as Velcro®) which allow eyewear element 3 to be removably attached to solid barrier 2. Solid barrier 2 may further comprise a cavity 7 surrounded having one or more eyewear attachment elements 7 at the perimeter of the cavity, therefore allowing light to pass only through the eyewear element and into the eyes of user 5.

Figure 2A:
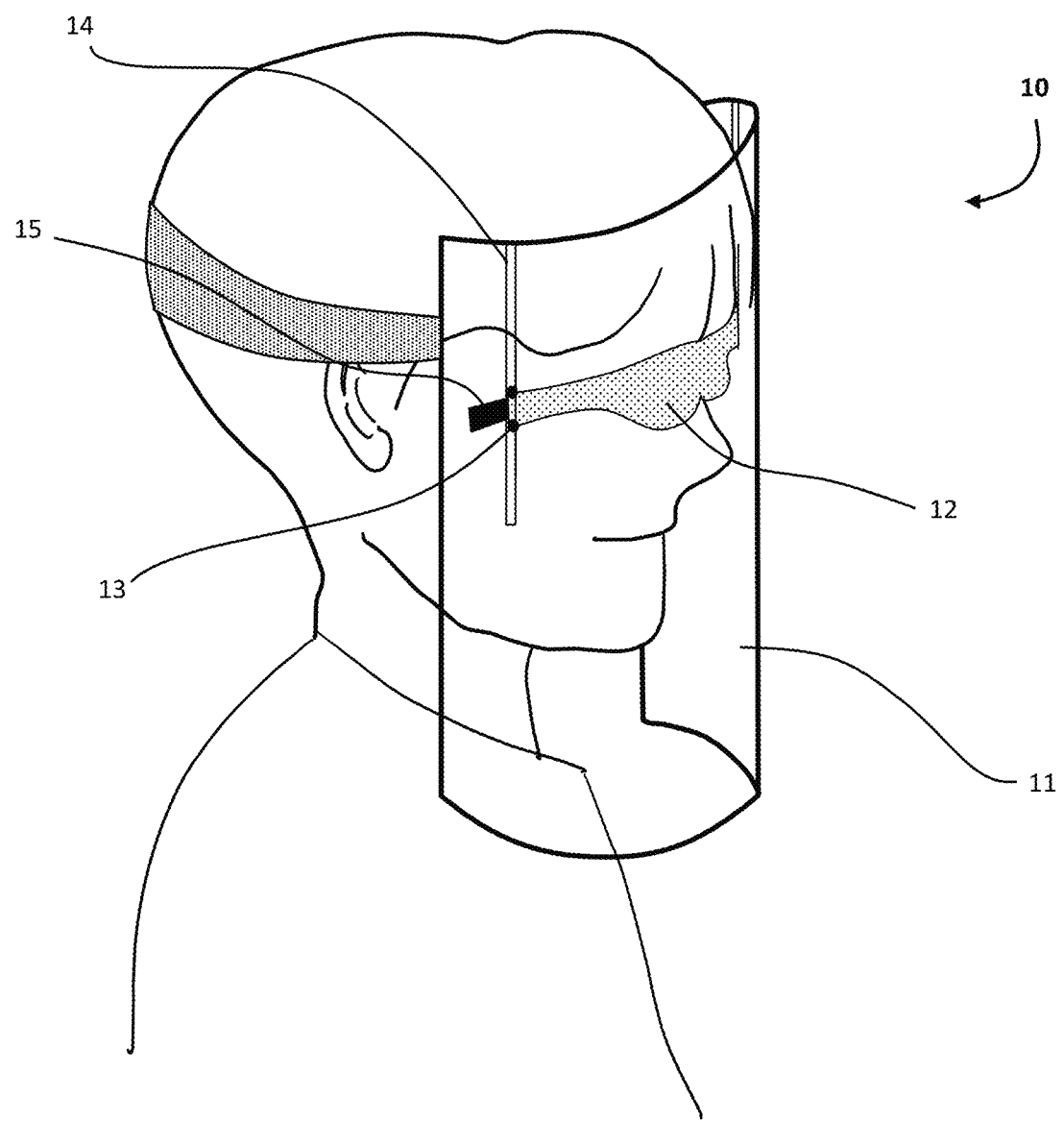
FIG. 2A is an illustration of a user wearing a face shield of the present disclosure where the eyeglass element is positioned to allow light to pass therethrough to the user's eyes.
Figure 2B:
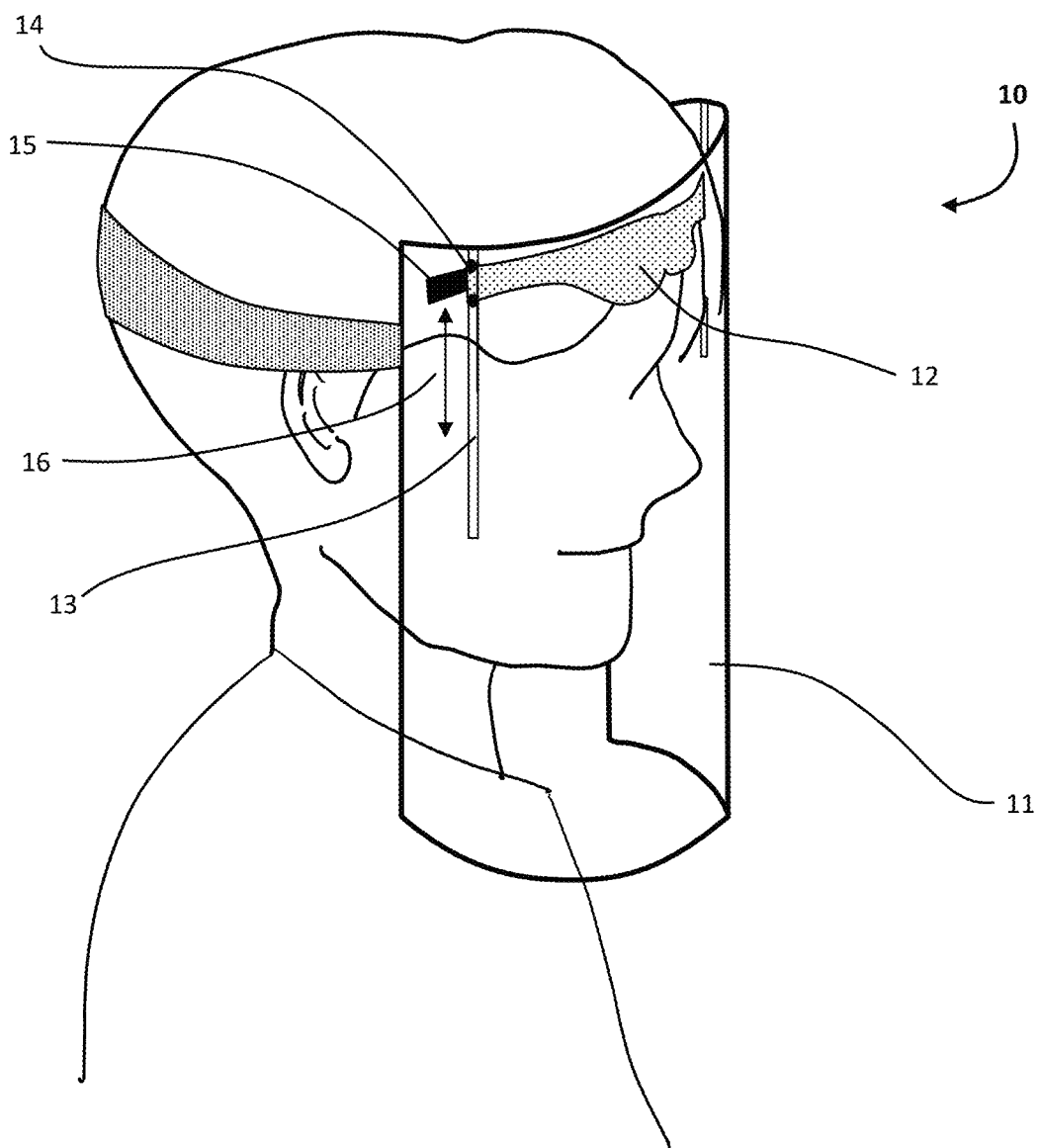
FIG. 2B is an illustration of a user wearing the face shield of FIG. 2A, wherein the eyeglass element has been moved to be positioned away from the eyes of the user.

The eyewear element may be attached at various positions of the solid barrier such that light may pass through both the solid barrier and the eyewear element. For example, the solid barrier may not comprise a cavity. In certain embodiments, the eyewear element is removably attached to the solid barrier such that the eyewear element is positioned between the solid barrier and the user's eyes. Referring now to FIGS. 2A and 2B, face shield 10 comprises solid barrier 11 which is removably attached to eyewear element 12. Eyewear element 12 is removably attached with one or more attachment elements 13 such as screws, nuts, and/or snaps. Eyewear element 12 fits into port 14 of solid barrier 11 allowing for eyewear element 12 to be positioned between solid barrier 11 and the user's eyes in a position similar to typical glasses wear. Eyewear element 12 may comprise handle 15. A user may grip handle 15 to allow eyewear element 12 to be moved away from the eyes by moving eyewear element 12 along port 14. As can be seen in FIG. 1B, eyewear element 12 may be moved away from the eyes along direction 16 by following the track of port 14.

The eyewear attachment elements may be configured for the eyewear element to be attached along the surface of the solid barrier where light passes through the solid barrier. In some embodiments, the light refracted through the lenses does not pass through the solid barrier when the eyewear element is attached to the solid barrier (e.g., the eyewear element is positioned within a cavity on the exterior surface of the face shield). In various implementations, the eyewear attachment elements are configured for the eyewear element to be attached and positioned between the solid barrier and a user's eyes when attached to the solid barrier (e.g., the eyewear element is positioned on the interior surface of the face shield, the eyewear element is positioned across the volume between the solid barrier and the users eyes and the attachment elements are on the sides of the face shield).

Other movement paradigms of eyewear elements during use of the face shields of the present disclosure are also possible. Referring now to FIG. 2C, face shield 20 comprises solid barrier 21 having port 24 which allows for insertion of eyewear element 22 in a configuration similar that depicted in FIG. 2A. Attachment element 23 allows for the rotation 26 of eyewear element 22 away from the eyes of the user. In certain embodiments, the eyewear element may be removably attached such that it may be removed from the face shield (e.g., by removal through a port) during use without removal of the face shield from the user. In certain implementations, the eyewear element may be rotated out of the volume between the solid barrier and the user's face without removal of the face shield. Such embodiments may allow for the cleaning of the eyewear element (e.g., to remove condensation that has collected on the lenses) and/or repositioning of the eyewear element without compromising the integrity afforded by the solid barrier.

Figure 3A:
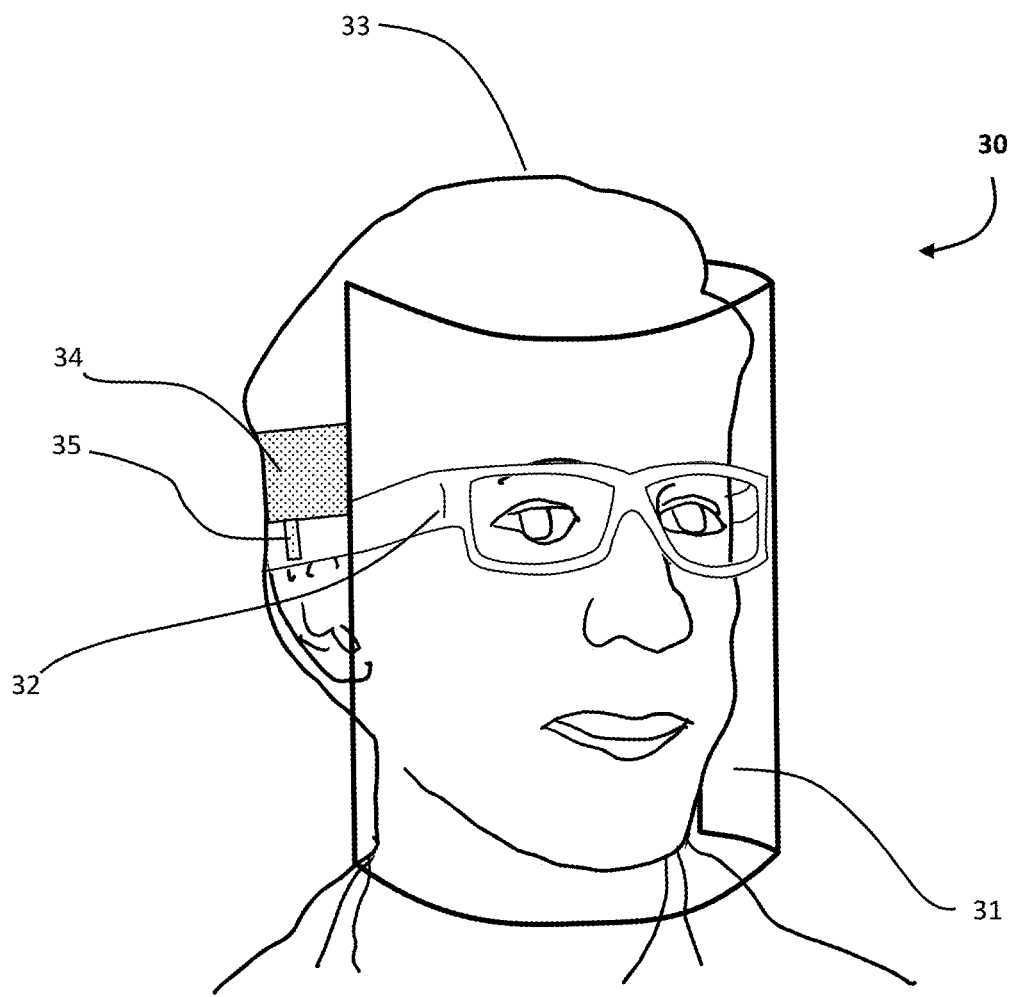
FIG. 3A is an illustration of a user wearing a face shield of the present disclosure attached to eyeglasses of the user in their typical position for use.
Figure 3B:
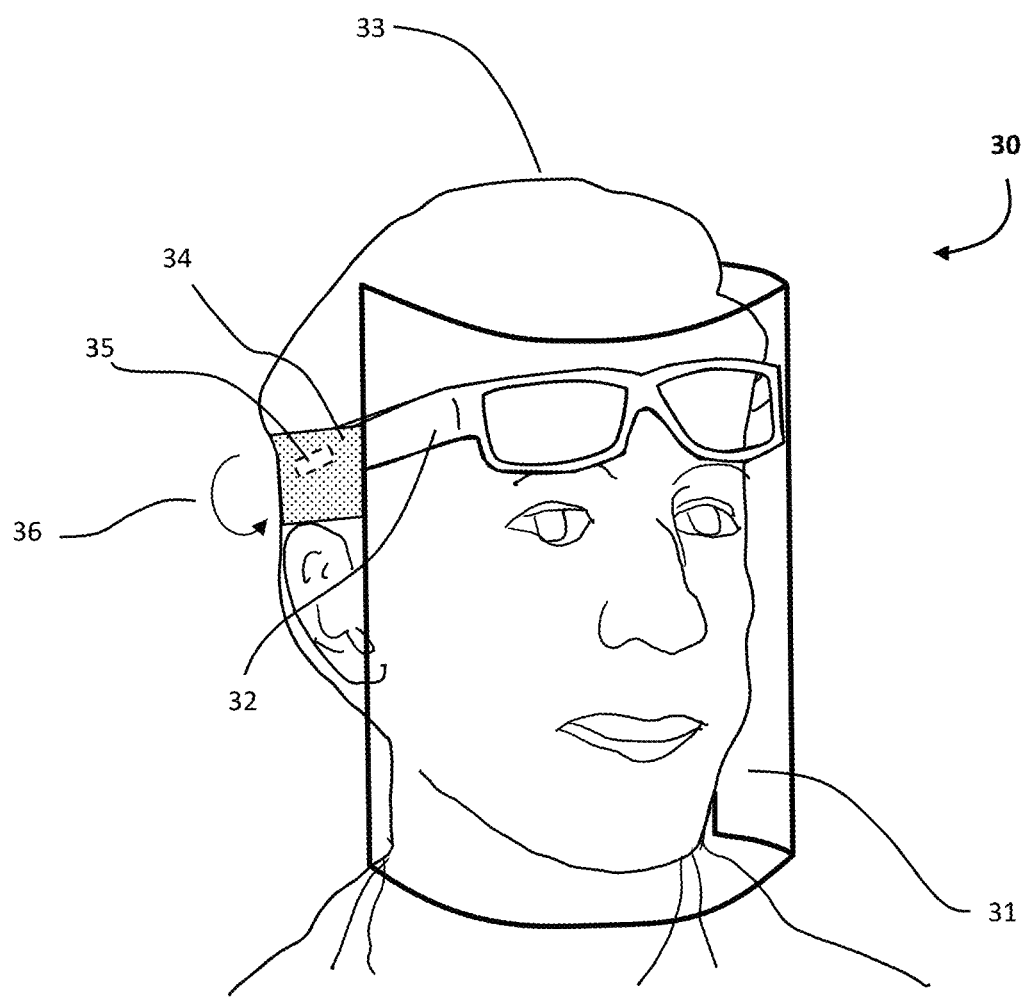
FIG. 3B is an illustration of user wearing the face shield of FIG. 3A, wherein the eyeglass have been moved away the eyes.

In certain implementations, the face shield may comprise:
 a) a solid barrier that prevents the passage of solids and liquids therethrough;
 b) an eyewear attachment element configured to attach or removably attach to eyewear;

c) an eyewear movement element configured to allow movement of the eyewear with respect to the solid barrier when said eyewear is attached;

wherein said eyewear movement element is configured such that attached eyewear may be moved into a first position where the lenses of the eyewear are positioned between the solid barrier and the eyes of a user wearing the face shield; the attached eyewear may be moved into a second position where the lenses of the eyewear are not positioned between the solid barrier and the eyes of a user wearing the face shield; and movement of the eyewear from the first position to the second position can be effectuated without removal of the face shield from the face of a user. Referring now to FIG. 3A, a face shield 30 having solid barrier 31 is depicted being worn by user 33 with eyewear 32. The face shield is supported by strap 34 which extends around the head of user 33. Eyewear 32 is attached (e.g., removably attached) to face shield 30 with one or more attachment elements 35. The attachment element may comprise ports designed to grip the frame of the eyewear such as those comprising hook and loop construction (e.g., Velcro®), adhesive, loops, clips, hooks, those which rely on frictional forces (e.g., rubber port) or combinations thereof. Attachment element 35 is attached to a movement element allowing for rotation of the eyewear away from the eyes of the user. As shown in FIG. 3B, the face shield comprises a movement element (not depicted) such as a ratchet or swivel located at the back of the head. The movement element is in communication with the attachment element allowing for a user to rotate 36 the eyewear 32 into a position away from the user's eyes without removal of the face shield.

In some embodiments, the eyewear is glasses (e.g., prescription glasses, reading glasses). The movement element may be configured to rotate the eyewear in the plane of facial symmetry (e.g., the glasses are rotated to the forehead of the user in the second position) as illustrated, for example, in FIG. 3B. In various implementations, the movement element is configured to allow linear movement of the eyewear element such as illustrated, for example, in FIG. 2B. In some embodiments, the movement element may be configured to rotate the eyewear in a plane substantially perpendicular to the plane of facial symmetry (e.g., the rotation plane has an angle with the facial symmetry plane of from 80° to 100°) as illustrated, for example, in FIG. 2C. In some embodiments, the face shield may comprise a handle removably attached to the frame of the eyewear, wherein the handle extends above the top portion of the face shield (i.e., the portion above the user's eyes) such that the user may move the handle to reposition the glasses as desired.

Figure 4B:
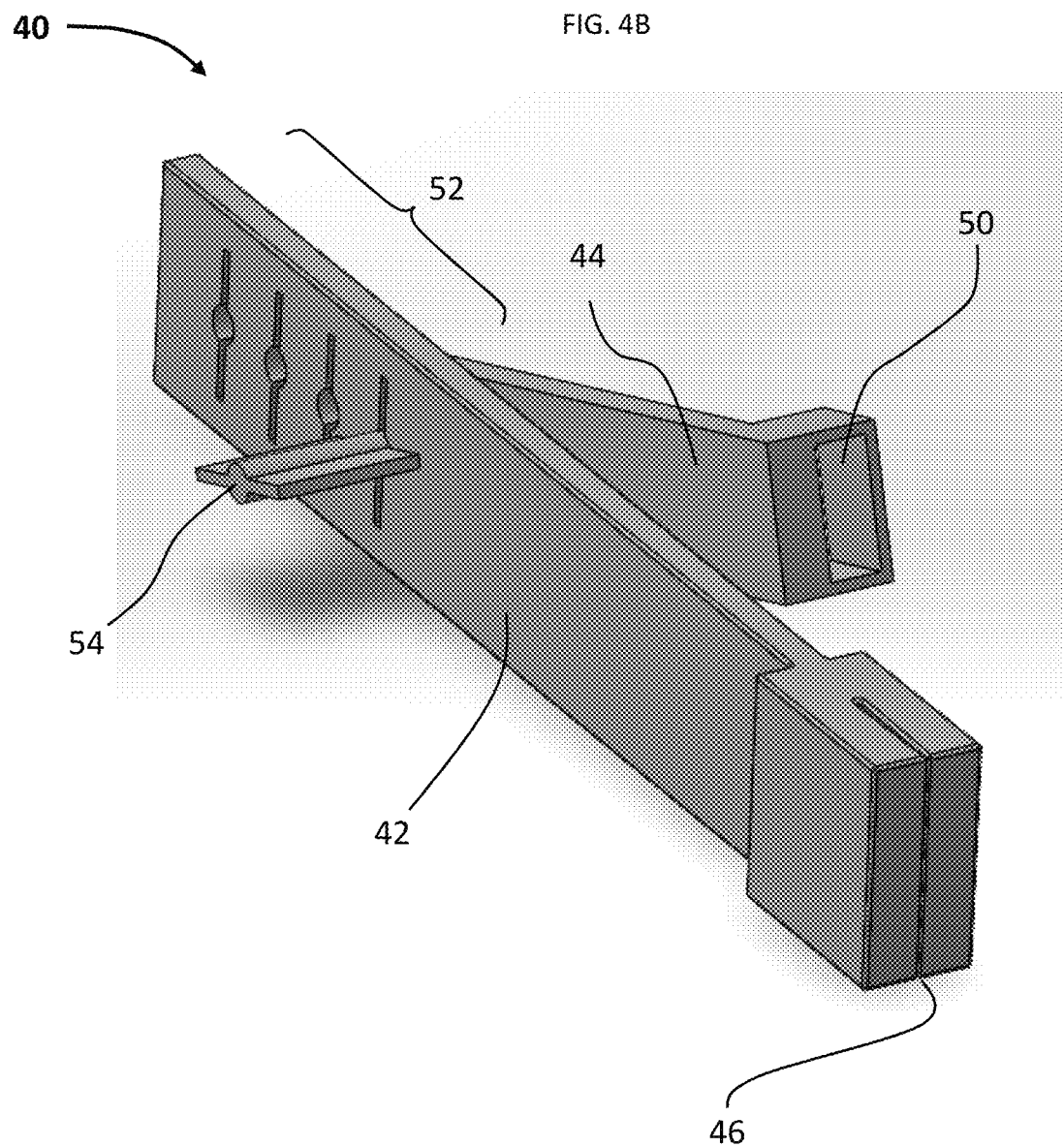
Figure 4D:
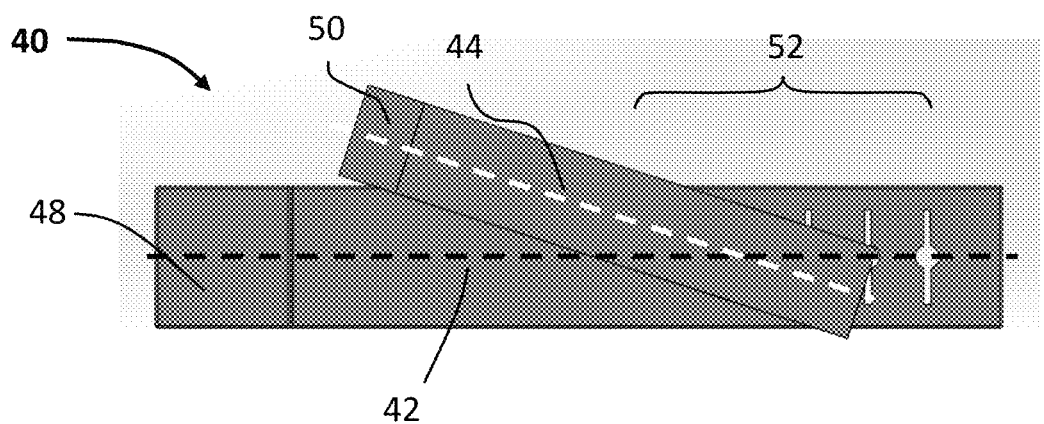
Figure 4E:
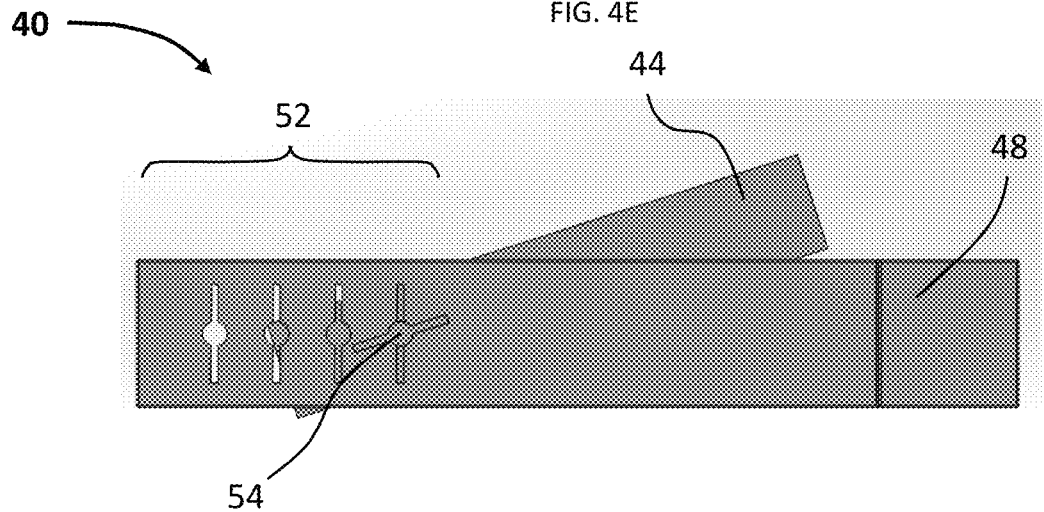
Figure 4F:
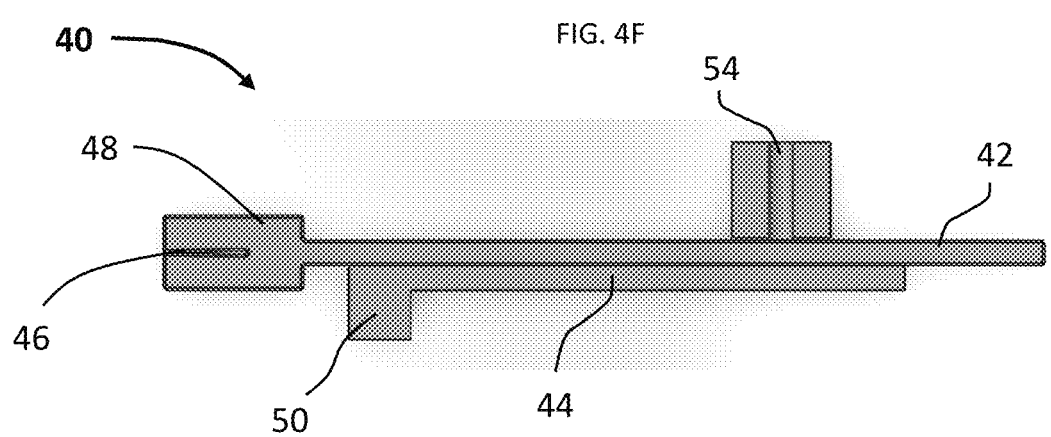

Referring now to FIGS. 4A-4F an apparatus is illustrated in perspective views (FIGS. 4A-4C) and side views illustrating the cross sectional shape of various portions of the apparatus (FIGS. 4D-4F). Apparatus 40 comprises a base portion 42 capable of being positioned on the solid barrier of a face shield with solid barrier attachment element 48. In the embodiment depicted, the solid barrier of a face shield may be inserted into attachment position 46, where frictional forces from the clip are exerted onto the face shield in order to support the apparatus and any eyewear attached thereto. Base portion 42 is attached to rotation portion 44 which comprises eyewear attachment element 50. Eyewear attachment element 50 is a port, dimensioned for a temple of eyewear to be inserted therethrough. Rotation element 44 is attached to base portion 42 through screw 52. Screw 52 in inserted through one hole in the plurality of holes 52 present on base portion 42 and connected into a matching hole (e.g., threaded hole) in rotation element 44. In some embodiments, the apparatus may adopt the opposite construction, where the rotation portion may comprise a hole for the screw to be inserted through and the base portion comprises one or a plurality of holes to match the screw or post (e.g., threaded holes). In FIG. 4D, the black dashed line shows the major longitudinal axis of the base portion and the white dashed line shows the major longitudinal axis of the rotation portion. Screw 54 can be hand tightened with the shown handle through any one of the plurality of holes 52 to allow a user to selectively position the apparatus for rotation where the temple tips of eyewear may sit on the ears of a user per typical wear. In some embodiments, the base portion may comprise a flexible portion (e.g., proximal to the solid barrier attachment element) in order to allow for the user to further set the plane of rotation with respect to the solid barrier. These apparatuses may attach to the side of the solid barrier. In some embodiments, two apparatuses may be attached on both sides of the solid barrier proximal to a user's ears. A user may attach the apparatus to a solid barrier and insert a temple of the eyewear through the port such that the base portion provides the requisite support, provided by the solid barrier, to afford rotation of the eyewear to an unobstructed position using the rotation portion.

A method is provided comprising:
a) attaching the apparatus according to claim 1 to the solid barrier with the solid barrier attachment element; and/or
b) attaching eyewear to the eyewear attachment element.

The method may comprise:
a) attaching a first apparatus having a first eyewear attachment element comprising a first port for a temple of eyewear;
b) attaching a second apparatus having a second eyewear attachment element comprising a second port for a temple of eyewear to a solid barrier of a face shield;
wherein said first apparatus and said second apparatus are those of the present disclosure (e.g., each are apparatus 40);
c) positioning a temple of eyewear through the first port; and
d) positioning a temple of eyewear through the second port;
wherein the first apparatus and second apparatus are attached to the solid barrier such that the temple tips of the eyewear in said first position are supported by a user's ears wearing said face shield. In various implementations, the first apparatus and second apparatus are attached to the solid barrier such that the temple tips of the eyewear in said second position are supported by a user's ears wearing said face shield.

Kits are also provided which may comprise:
a) a solid barrier that prevents the passage of solids and liquids therethrough; wherein said solid barrier comprises one or more eyewear attachment elements configured to allow for an eyewear element to be removably attached to said solid barrier; and
b) an eyewear element capable of being removably attached to said solid barrier comprising lenses which refract light into the eyes of a user wearing the face shield when the eyewear element is attached to the solid barrier.

Typically, the eyewear element comprises a frame portion attached (e.g., removably attached) to lenses which refract the light into the eyes of the user during the specific use of the face shield. In some embodiments, the eyewear element may comprise one or more pairs of interchangeable lenses, each pair of interchangeable lenses attachable to and removable from a lens receiving area of the frame portion, and wherein each interchangeable lens is configured to be inserted into one of the lens receiving areas; and a nose bridge portion removably attached to the frame portion. In some embodiments, the kit may comprise an eyewear element comprising a frame portion having one or more lens receiving areas. Eyewear elements include those described in U.S. Pat. No. 10,649,237, which is hereby incorporated by reference in its entirety.

Figure 5A:
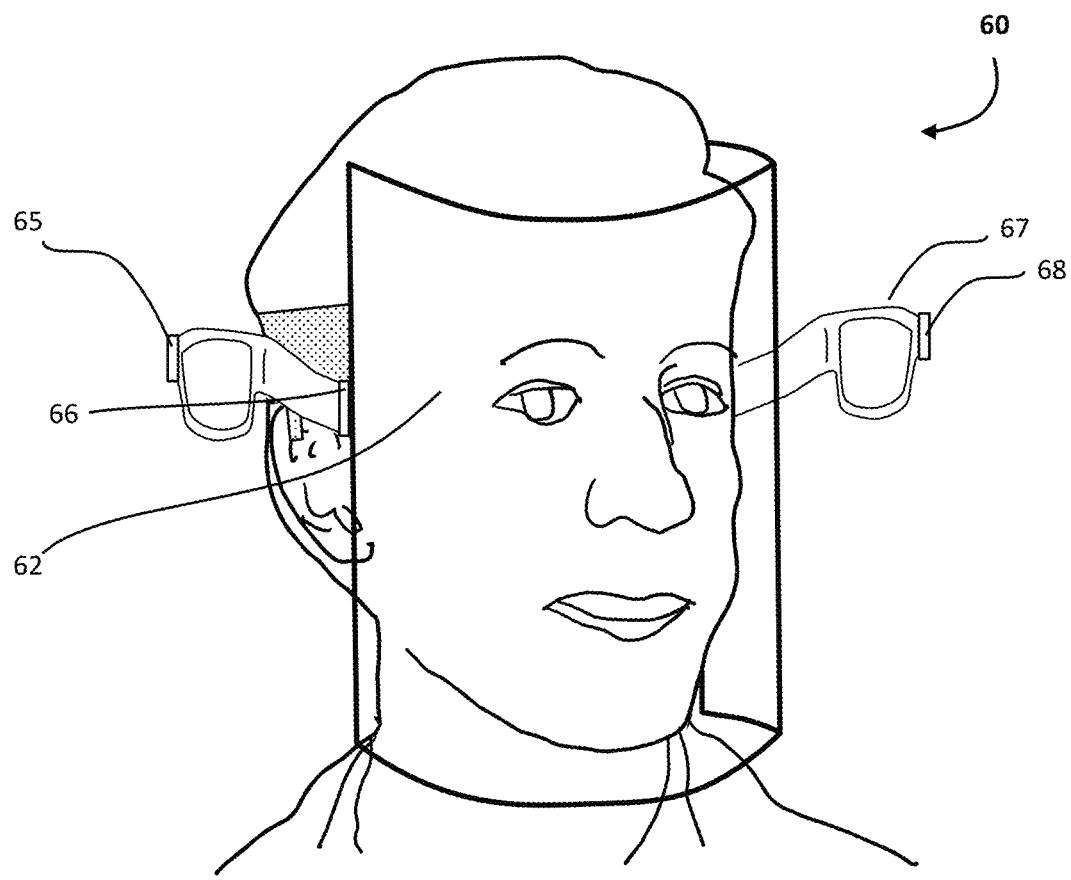
FIG. 5A is an illustration of a user wearing a have a face shield with eyewear configured for separation into two portions.
Figure 5B:
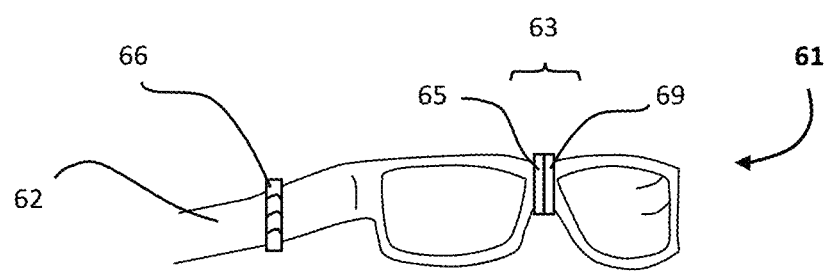
FIG. 5B is an illustration of the eyewear in FIG. 5A, with the two portions reattached at the bridge of the eyewear.

Referring now to FIGS. 5A and 5B, face shield 60 being worn by a user is illustrated. Eyewear 61 comprises bridge portion 63 which is separable. Eyewear 61 when separated at bridge portion 63 forms a first portion 65 and a second portion 67 each comprising a lens and a temple. The two portions are held together with magnets 65 and 68 which exert an attractive magnetic force between one another to keep the first and second eyewear portions together. In some embodiments, only one of these separable bridge portions comprises a magnet and the other is a metallic material such that a magnetic attraction between each portion is created. The portions may be separated and As shown in FIG. 5A, each portion may be moved to a position outside of the solid barrier via eyewear movement elements such as hinge 66. The present disclosure embraces face shields comprises eyewear having this configuration and the eyewear itself (particularly for use with a face shield). While wearing the face shield, a user may grip the temple of on portion (or a handle attached thereon), and rotate the portion via hinge 66 to a position unobstructed by the solid barrier in order to access the lens of the eyewear portion. This movement may be effected without removal of the solid barrier from the protective position in front of the user's face. Again, without movement of the face shield, the portion may then be rotated back into position, where the magnetic attraction between each portion of the bridge can orient the eyewear into a proper viewing position.

The eyewear element may comprise lenses which correct a user's vision (i.e., prescriptive lenses). In some embodiments, the lenses may magnify an image such as those lenses typically used for reading. In some embodiments, the lenses may be are bifocal or trifocal lenses. The eyewear element (e.g., lenses), may comprises one or more coatings as well such as UV coating, anti-fog coating, scratch-resistance coating, and combinations thereof. For example, the lenses (e.g., polycarbonate lenses) comprise two or more of UV, anti-fog, and scratch-resistance coating. In certain embodiments, the lenses may comprise a hydrophilic coating to produce a long-lasting, durable anti-fog effect. The coating can include a molecular-level blend of at least two hydrophilic polymers. The coating can be made, for example, by a layer-by-layer assembly process, though other techniques can be used. The layer-by-layer assembly can be a water based process, thereby avoiding solvents and chemicals that can damage many plastic substrates (such as polycarbonate and poly(methyl methacrylate)) that are widely used in optical applications. The conformal coatings can be applied by, for example, a dip-, spin-, or spray-assembly process. The anti-fog coatings can be highly transparent and have highly effective antifogging performance under a variety of conditions. The durability of the coatings can be increased by a variety of common crosslinking and surface modification methods. In particular embodiments, the lenses are prescription lenses.

The devices described herein, such as the face shield, the apparatus, the base portion of the apparatus, the rotation portion of the apparatus, and the rotation elements (e.g., swivel, post, screw) may each be made of a unitary piece of plastic. Suitable plastics include polypropylene, polyethylene, thermoplastic polyurethane, thermoplastic rubber, thermoplastic elastomer, nylon (polyamide), acrylic, polycarbonate, polyoxymethylene, polystyrene, acrylonitrile butadiene styrene, or polyphenylsulfone, among others. Suitable production methods for these components include injection molding, compression molding, and/or 3-dimensional (3D) printing. The mold used in either production method features a single cavity per manufactured component.

As various changes can be made in the above-described subject matter without departing from the scope and spirit of the present disclosure, it is intended that all subject matter contained in the above description, or defined in the appended claims, be interpreted as descriptive and illustrative of the present disclosure. Many modifications and variations of the present disclosure are possible in light of the above teachings. Accordingly, the present description is intended to embrace all such alternatives, modifications and variances which fall within the scope of the appended claims.

All documents cited or referenced herein and all documents cited or referenced in the herein cited documents, together with any manufacturer's instructions, descriptions, product specifications, and product sheets for any products mentioned herein or in any document incorporated by reference herein, are hereby incorporated by reference, and may be employed in the practice of the disclosure.

The invention claimed is:

1. An apparatus comprising:
   a) a solid barrier attachment element configured to removably attached to a solid barrier of a face shield;
   b) an eyewear attachment element configured to removably attach to eyewear;
   c) an eyewear movement element configured to allow movement of the eyewear with respect to the solid barrier when said eyewear is attached;
   wherein said eyewear movement element is configured such that attached eyewear may be moved into a first position where the lenses of the eyewear are positioned between the solid barrier and the eyes of a user wearing the face shield with the apparatus attached thereto; the attached eyewear may be moved into a second position where the lenses of the eyewear are not positioned between the solid barrier and the eyes of a user wearing the face shield with the apparatus attached to the solid barrier; and
   movement of the eyewear from the first position to the second position can be effectuated without removal of the face shield from the face of a user.

2. The apparatus according to claim 1, having a base portion comprising said solid barrier attachment element and a rotation portion comprising said eyewear attachment element at an end thereof;
   wherein said rotation portion is attached to said base portion by a swivel.

3. The apparatus according to claim 2, wherein said swivel is formed from a post which extends through said base portion comprises a point of attachment for said post; or
   said swivel is formed from a post which extends through said rotation portion and said base portion comprises a point of attachment for said post.

4. The apparatus according to claim 3, wherein said post is a screw comprising a threaded portion and said point of attachment is a threaded hole dimensioned for said screw.

5. The apparatus according to claim 2, wherein said base portion comprises a plurality of holes independently threaded and unthreaded, and wherein said each of said holes in said plurality of holes is dimensioned for insertion of a post to form the swivel.

6. The apparatus according to claim 2, wherein said base portion comprises a major longitudinal axis and said solid barrier attachment element is at a distal end of said base portion along the major longitudinal axis.

7. The apparatus according to claim 6, wherein said base portion comprises a plurality of holes dimensioned for insertion of a post to form the swivel;
wherein said plurality of holes are positioned along the major longitudinal axis.

8. The apparatus according to claim 3, wherein said base portion is dimensioned such that temple tips of the eyewear in said first position are supported by a user's ears wearing said face shield.

9. The apparatus according to claim 6, wherein said base portion comprises a plurality of holes dimensioned for insertion of a post to form the swivel;
wherein said plurality of holes are positioned along the major longitudinal axis at the end of the base portion opposite the distal end comprising the solid barrier attachment element.

10. The apparatus according to claim 2, wherein the cross section of the base portion is rectangular and/or the cross section of the rotation portion is rectangular.

11. The apparatus according to claim 2, wherein said rotation portion comprises a major longitudinal axis and said eyewear attachment element is at a distal end of said rotation portion along the major longitudinal axis.

12. The apparatus according to claim 2, wherein said base portion is made of a unitary piece of injection molded plastic.

13. The apparatus according to claim 2, wherein said rotation portion is made of a unitary piece of injection molded plastic.

14. The apparatus according to claim 3, wherein said post is made of a unitary piece of injection molded plastic.

15. A method comprising:
a) attaching the apparatus according to claim 1 to the solid barrier with the solid barrier attachment element; and/or
b) attaching eyewear to the eyewear attachment element.

16. The method according to claim 15, wherein the eyewear attachment element comprises a port for a temple of the eyewear; and said attaching eyewear step comprises
positioning the temple of eyewear through the port.

17. The method according to claim 16, wherein the first apparatus and second apparatus are attached to the solid barrier such that the temple tips of the eyewear in said second position are supported by a user's ears wearing said face shield.

18. A face shield comprising:
a) a solid barrier that prevents the passage of solids and liquids therethrough;
b) eyewear comprising a bridge between lenses; wherein said bridge is configured to separate the eyewear into a first portion and a second portion; wherein said first portion and said second portion each comprises a lens and a temple frame of the eyewear; and
said bridge comprises a bridge attachment element to attach said first portion and said second portion together;
c) an eyewear movement element configured to move said first portion or said second portion to a position where the lens of the portion attached to the eyewear movement element is not positioned between the solid barrier and the eyes of a user wearing the face shield;
wherein when said first portion and said second portion are attached at said bridge, the lenses of the eyewear are positioned between the solid barrier and the eyes of a user wearing the face shield; and
movement of the eyewear portion can be effectuated without removal of the face shield from the face of a user.

19. The face shield according to claim 18 comprising a first eyewear movement element attached to the first portion and a second eyewear movement element attached to the second portion.

20. The face shield according to claim 18, wherein said bridge attachment element comprises a magnetic attraction to attach said first portion and said second portion together.

* * * * *